United States Patent

[11] 3,613,805

[72] Inventors: Jon R. Lindstad, South Milwaukee; Thomas A. Stoner, Brookfield, both of Wis.
[21] Appl. No.: 854,963
[22] Filed: Sept. 3, 1969
[45] Patented: Oct. 19, 1971
[73] Assignee: Bucyrus-Erie Company, South Milwaukee, Wis.

[54] AUTOMATIC CONTROL FOR ROTARY DRILL
7 Claims, 3 Drawing Figs.
[52] U.S. Cl. .................................. 175/27, 175/48, 173/4
[51] Int. Cl. .................................. E21b 3/02, E21c 1/10
[50] Field of Search .................................. 175/27, 38, 51, 48, 114, 113, 122, 162; 166/250, 53, 64; 73/151, 151.5; 173/2, 4, 22

[56] References Cited

UNITED STATES PATENTS

| | | | |
|---|---|---|---|
| 2,679,381 | 5/1954 | Royer et al. | 175/27 X |
| 3,373,823 | 3/1968 | Fullerton, Jr. et al. | 175/27 X |
| 3,382,713 | 5/1968 | Chutter | 73/151 |
| 3,502,543 | 3/1970 | Sewell | 175/162 X |
| 3,522,727 | 8/1970 | Calhoun | 73/151.5 |

*Primary Examiner*—Stephen J. Novosad
*Attorneys*—Thomas O. Kloehn and Arthur H. Seidel

ABSTRACT: An automatic blasthole drill, in addition to rotary and downfeed speed controls, has an automatic depth control to effect collaring and automatic hoist when desired depth is reached, an automatic water injection system responsive to the depth control and air pressure devices to control the amount and turnoff of water injection, and air-pressure-responsive protective devices to vary water injection and to trigger automatic shut down. The circuits and devices for effecting the mentioned controls are disclosed in detail. A copending application incorporated by reference discloses a downfeed speed and force control responsive to rotary torque.

AUTOMATIC CONTROL FOR ROTARY DRILL

BACKGROUND OF THE INVENTION

Blast hole drills are used primarily in surface mining to drill holes for explosives. Hence, these drills usually bore holes ranging in depth from 15 to 60 feet, although blasthole drills have been used to drill holes as deep as 400 feet. Rising labor costs and the relatively low efficiency of manually controlled blasthole drills have generated an increasing demand for an automatically controlled blasthole drill. To achieve automatic control of a blasthole drill, the manual operation must be analyzed and reduced to a limited series of operations that will economically submit to automatic control. Then means must be found to automate those operations with a sufficient increase in efficiency to justify the necessarily increased initial investment.

Ideally, the blasthole drill would maintain the rotary and linear speed of the drill stem at preset optimum values throughout the drilling operation. However, the initiation of drilling into the loose topsoil, called collaring, should be performed at reduced rotary and downfeed rates. Hence an automatic system should provide the operator with means to preset the drilling speed, collaring speed, and the collaring depth, so that the machine may be started and allowed to operate unattended until the hole is finished.

During drilling the drill cuttings must be removed from the hole. This is presently accomplished by pumping compressed air through the hollow drill stem and out of holes in the bit, so that the resulting airblast blows the cuttings out of the hole. The resulting dust can be a health hazard to those in the area of the machine and means must be provided to filter or confine the dust. It has been standard practice to confine the large particles by placing a canopy over the hole area and filter out the fine dust with a precipitator filter. However, the creation of dust can be minimized or eliminated by injecting enough water into the airblast stream to dampen and coagulate the fine particles, and thus to prevent the formation of the undesirable dust cloud around the machine.

An automatic system to control both the compressed air and the water injection must have several capabilities. It must allow an initial setting of the volume of waterflow appropriate to the anticipated condition of the strata being drilled. However, if drilling conditions change as the drill progresses, the preset water level may become excessive and muddy the bottom of the hole. Excessive waterflow accelerates bit wear and increases the airblast pressure, which tends to overheat the air compressor. Hence an automatic machine must detect excess waterflow, shut off the water injected when the hole becomes muddy, and decelerate the feed rate when the air pressure becomes excessive. Furthermore, if the dangerously elevated air pressure is not thus corrected, the machine must automatically shut down to prevent damage to the air compressor.

The depth of the hole during drilling has been determined in the past by the skilled operator's visual estimate, though counters have recently been introduced to calculate the hole depth. An automated drill must provide means to determine the depth at which the collaring is to cease, the depth at which the water injection is to be stopped, and the depth at which drilling is to cease and the hoist sequence to begin, and it must automatically initiate each of these steps in the drilling operation at the proper depth. Water injection should be stopped before the total hole depth is reached so the hole will be dry when drilling ceases to receive the explosives. When final depth is reached, drilling should automatically cease, the drill should be automatically hoisted out of the hole, and annunciators or other warning devices should automatically notify the operator.

Incorporating all of these features into an automatic machine which will also automatically respond to unpredicted changes in drilling conditions while unattended by the operator involves not only complex machinery and electronics to control drilling parameters, but also the discovery of those detectable and measurable parameters that are important in maintaining high drilling efficiency and will indicate abnormal drilling conditions requiring operating adjustments.

SUMMARY OF THE INVENTION

The present invention relates to an automatic control for rotary blasthole drills. More specifically, the invention resides in combinations of components including a hollow rotary drill which is mounted for axial downfeed and rotation about its axis, a downfeed motor which is responsive to a command signal and which drives the drill axially at a preset rate, a rotary drive motor which rotates the drill at a preset speed, and one or more of the following: A compressed air system which forces compressed air through a hollow rotary drill to expel drill cuttings, a water injection system which injects preset amounts of water through the hollow rotary drill and which responds to a command signal to reduce or stop the waterflow, an air pressure sensor which detects the air pressure in the system and generates an air pressure signal proportional to said pressure, an air pressure monitor which receives the air pressure signal and transmits said command signal to the water injection system to modify water injection and to said downfeed motor to reduce or reverse the axial drive of the rotary drill at predetermined air pressure levels, a depth counter which detects the depth of said drill and transmits a collaring command signal to the downfeed and rotary drive motors to reduce the axial and rotary drive of the drill during collaring, a depth counter which transmits a water turnoff command signal to the water injection system when the drill reaches a predetermined depth, a depth counter that transmits a hoist command signal to the downfeed motor to hoist the drill at the desired hole depth, and a reversal sensor that automatically hoists the drill if the drill is caused to retract more than a preset amount.

The foregoing combination provides a means for automatically drilling blastholes. It allows the operator to preset the drilling speed and collaring speed by setting the control circuits of the downfeed and rotary drive motors, which speeds will then be effected automatically at desired depths. It allows the operator to set the depth counter to the desired collaring depth, wet depth and total depth. The operator can also select and preset the desired quantity of water injection according to the anticipated drilling conditions in the particular terrain, and the preset water injection will occur automatically or adjust the water injection automatically if unanticipated conditions require modification of the original settings. The automatically effected modification will be recorded by the machine and noticed to the operator so that he can make adjustments in his presettings. When the total drilling depth called for is reached the downfeed motor will automatically hoist the drill out of the hole, turn the machine off and alert the operator.

If during operation the strata being drilled changes or the operator erred in his estimate of the amount of water injection needed, causing the hole to become muddy, the air pressure required to clear the hole of ore will increase. This increased air pressure is sensed by the air pressure sensor and measured by the air pressure monitor. A signal from the air pressure monitor turns off the water injection until the pressure subsides. If pressure continues to rise, a second signal is sent to first reduce and then reverse the downfeed of the drill until pressure drops. When the pressure drops to a safe level, the normal drilling and water injection is automatically resumed. To prevent reoccurrence of the same problem when the water injection resumes, the waterflow is automatically reduced and an indicator lights to notify the operator, so that he will reduce the water injection rate called for before starting another hole in the same terrain. If the air pressure does not fall back to normal when water injection has been stopped and there is danger of damaging the air compressor, the downfeed will automatically reverse. If the drill is raised between 8 to 12 inches the hoist sequence is initiated which stops drilling and alerts the operator.

The invention automates the drill sufficiently to eliminate the need for attendance by an operator during drilling. Thus one operator can operate numerous drills simultaneously, or can be freed to perform other duties. Also the amount of training required of an operator is drastically reduced. Notwithstanding reduced operator training and no attendance during drilling, the automatic drill embodying the present invention will operate more efficiently than an operator-controlled drill.

DESCRIPTION OF THE PREFERRED EMBODIMENT

Figure 1:
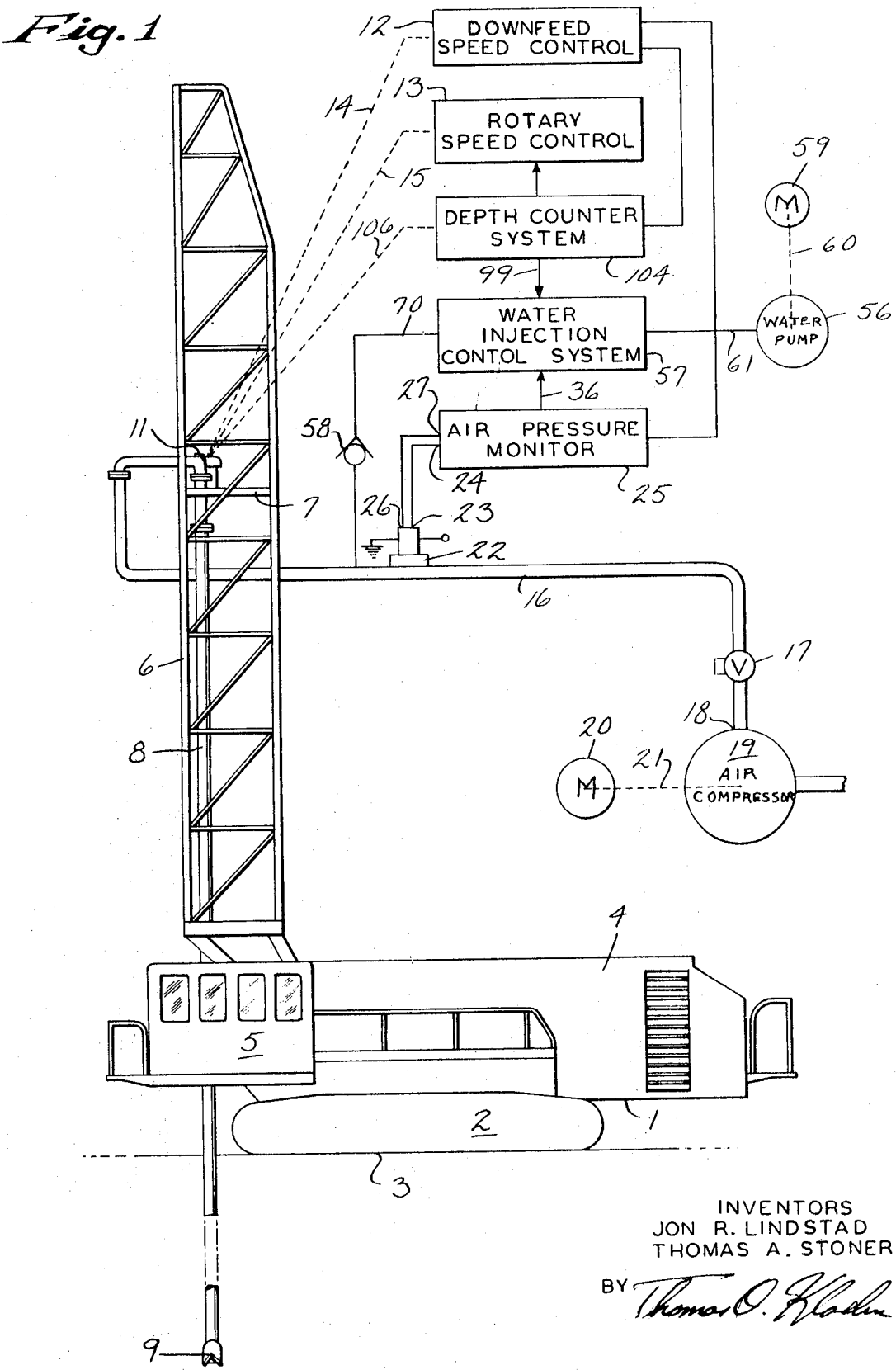
FIG. 1 is a diagrammatic block representation of the blasthole drill embodying the present invention.

A typical blasthole drill embodying the present invention has a crawler-type running gear 2 with an endless track 3 which supports and propels a main frame 1 on which all of the drill mechanism and supporting structure is mounted. A machinery housing 4 on the main frame 1 encloses most of the power and control apparatus, and an operator's cab 5 is also provided on the main frame 1. The frame 1 also supports a mast 6, which is shown in its vertical, raised position. A vertical traverse unit 7 which supports the drill 8 and bit 9, is mounted for reciprocating vertical movement on the mast 6. The vertical traverse unit 7 is driven up and down the mast 6 by a hydraulic downfeed drive motor 10 (not shown in FIG. 1). An electric rotary drive motor 11 is mounted on the vertical traverse unit 7 and is mechanically connected to the drill 8 to rotate the drill 8. A downfeed motor speed control 12 is located in the machinery housing 4, and a hydraulic transmission line 14 links the downfeed speed control 12 to the downfeed drive motor 10. A rotary speed control 13 is also located in the machinery housing 4, and an electrical connection 15 links the rotary speed control 13 with the rotary motor 11.

Both the downfeed drive, including the motor 10 and the speed control 12, and the rotary drive, including the motor 11 and control 13, are conventional, commercially available units. In addition to those units the blasthole drill also includes a downfeed control which is disclosed in the copending U.S. Pat. application of the same inventors and owned by the same assignee as this invention and entitled "Linear Feed Control for a Rotary Tool," filed on Sept. 3, 1969, Ser. No. 854,871, the disclosure of which is incorporated here by reference. As is shown in that application, the rotary drive motor 11 is a separately excited, DC motor and powered by an M-G set. The rotary speed control 13 is a purchased unit that employs armature current and armature voltage feedback signals and a reference signal from either of two speed control potentiometers. The downfeed drive motor 10 is a vane-type hydraulic motor that is controlled by a four-way directional and flow control valve. The speed control 12 for the downfeed motor 10 employs a tachometer feedback and a reference signal from a potentiometer, which are compared to produce an error signal that controls the directional and flow control valve, which is electrically controlled and pilot operated. The hydraulic downfeed motor 10 is powered by a constant displacement pump that is driven by an AC motor.

An air conduit 16 is coupled to the hollow drill at its top end through a coupling (not shown) that allows the air conduit 16 to remain stationary while the drill 8 rotates. The air conduit 16 stretches from the mast 6 into the machinery housing 4 where the air enters it through a manually operated flow control valve 17 from an exhaust port 18 of an air compressor 19. An electric motor 20 drives the air compressor 19 through a mechanical linkage 21. The air compressor 19 has a constant output and the operator actuates the air valve 17 to release the air to atmosphere or to force air through the hollow drill 8 and out jet holes (not shown) in the bit 9.

An air pressure sensor 22 is connected to the air conduit 16 and its output terminals 23 and 26 are respectively connected to a pair of input terminals 24 and 27 of the air pressure monitor 25, which is also located inside the machinery housing 4. The air pressure sensor 23 contains a diaphragm (not shown) exposed to the air pressure inside the air conduit 16. The air pressure sensor 23 also contains an electrical bridge (not shown), at least one leg of which includes a strain gauge (not shown) mounted on the diaphragm. Hence, the bridge will originate a DC signal proportional to the deflection of the diaphragm and thus proportional to the pressure of the air in the conduit 16. The details of the air pressure monitor 25 are shown in FIG. 2.

Figure 2:
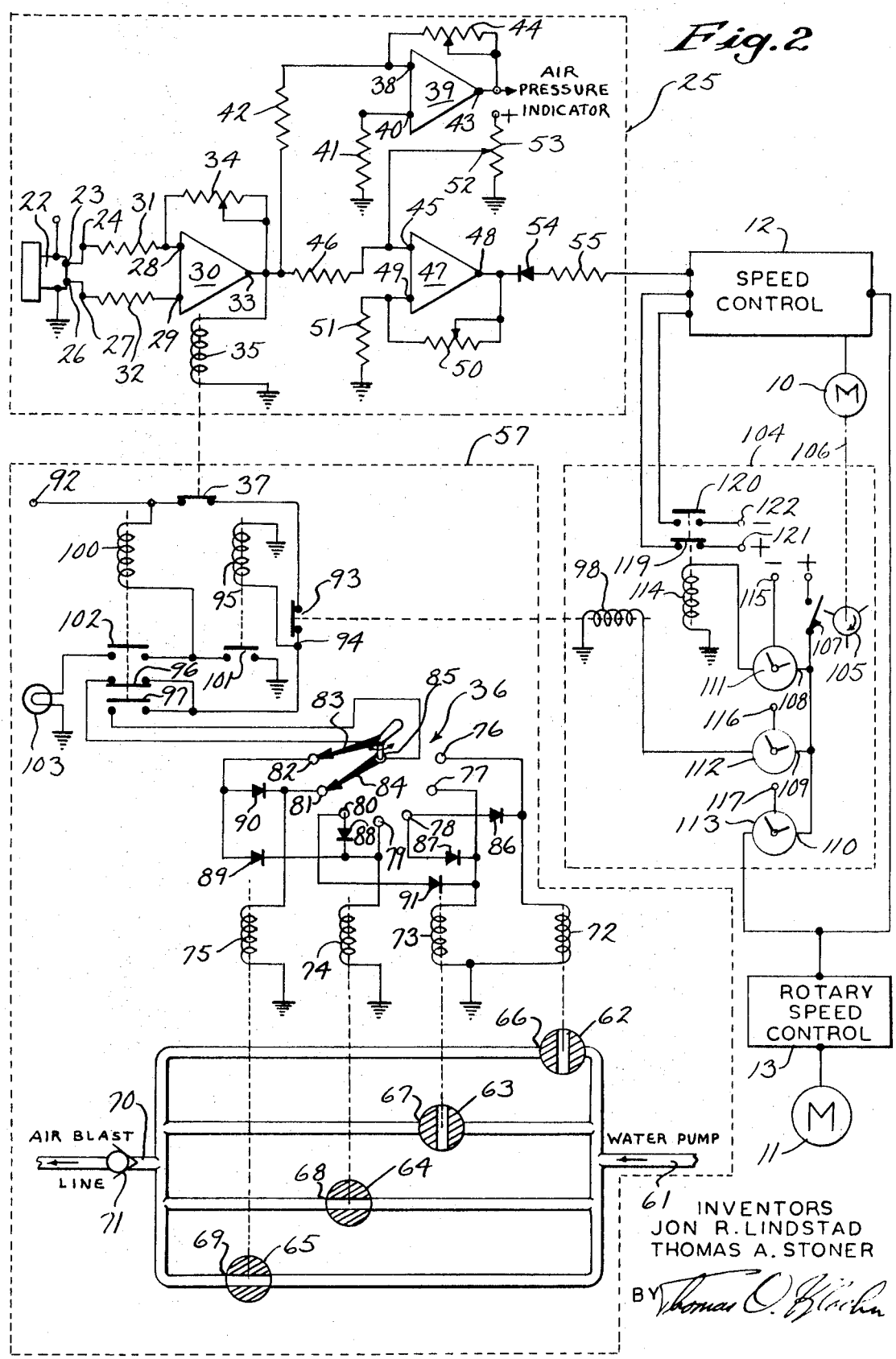
FIG. 2 is a schematic diagram of a preferred embodiment of the automatic control represented in block diagram in FIG. 1.

Referring to FIG. 2, the input terminals 24 and 27 of the air pressure monitor 25 are also connected to respective input terminals 28 and 29 of a pressure sensor amplifier 30 through a pair of coupling resistors 31 and 32, respectively. The pressure sensor amplifier 30 is a differential input operational amplifier, which has its output terminals 33 connected to its inverting input terminal 28 through gain control potentiometer 34. Polarities are such that the output terminal 33 of the pressure sensor amplifier 30 is driven negative in direct proportion to an increase in air pressure in the air conduit 16. The output terminal 33 of pressure sensor amplifier 30 is connected to ground through relay coil 35. The magnetic field generated by the relay coil 35 actuates the normally closed water shutoff switch 37 when the output terminal 33 reaches a certain negative value.

The output terminal 33 of the pressure sensor amplifier 30 is also connected to an inverting input terminal 38 of a pressure indicate amplifier 39 through a coupling resistor 42. A noninverting input terminal 40 of the pressure indicate amplifier 39 is connected to ground through resistor 41. A gain control potentiometer 44 connects the inverting input terminal of the pressure indicate amplifier 39 to its output terminal 43. The signal from the output terminal 43 of the pressure indicate amplifier 39 is a positive voltage directly proportional to the air pressure in the airhose 16 and suitable for driving a meter or other indicator (not shown). The gain control potentiometer 44 for the pressure indicate amplifier 39 is adjusted to calibrate the indicator reading with the actual air pressure being measured.

The output terminal 33 of the pressure sensor amplifier 30 is also connected to a noninverting input terminal 45 of an air pressure feedback amplifier 47 through a coupling resistor 46. The air pressure feedback amplifier 47 has its output terminal 48 connected to its inverting input terminal 49 through a gain potentiometer 50. The input terminal 49 is in turn connected to ground through a resistor 51. The noninverting input terminal 45 of the air pressure feedback amplifier 47 is connected to a slider 52 of a bias potentiometer 53, one end of which is connected to a positive DC bias voltage and the other end is connected to ground. The air pressure feedback amplifier 47 has its output terminal 48 connected to the linear speed control 12 through a blocking diode 54 and coupling resistor 55.

When a negative voltage appears at the output terminal 48 of the air pressure feedback amplifier 47, the blocking diode 54 conducts and the current subtracts from the preset positive reference current in the downfeed speed control 12 thus slowing the downfeed drive motor 10, or reversing it, if the output 48 swings sufficiently negative. During normal drilling, the positive bias current on noninverting input terminal 45 of the air pressure feedback amplifier 47 will produce a positive signal at the output terminal 48, which is blocked by the blocking diode 54, resulting in no current flow to the linear speed control 12. As the air pressure in the airline increases, a proportionately increasing negative current is transmitted from the output terminal 33 of the air pressure sensor amplifier 30 to the noninverting input terminal 45 of the air pressure feedback amplifier 47. When this negative current equals the positive bias current, the output terminal 48 will swing negative and the downfeed rate will begin to decelerate. The air pressure at which downfeed rate is first reduced is determined by the setting of the slider 52 of bias potentiometer 53, and the amount of deceleration that occurs when this air pressure is exceeded is governed by gain potentiometer 50.

Referring to FIG. 1, water is forced by a water pump 56 through a water injection control system 57 and through a check valve 58 into the air conduit 16, which carries it to the hollow drill 8. The water pump 56 is driven at a constant speed by an electric motor 59 through a mechanical linkage 60. The water injection control system 57 determines the amount of water flow, and it will turn the water off completely, responsive to a command signal from either the air pressure monitor 25 or a depth counter system 60. The detailed schematic diagram of the water injection control system 57 is shown in FIG. 2.

In FIG. 2, the water injection control system 57 is shown within a broken line box of the same reference numeral. Water enters from the water pump 56 (not shown in FIG. 2) through a common inlet line 61. The common inlet line 61 divides and connects to parallel-connected, electrically operated, first, second, third and fourth flow control valves 62, 63, 64 and 65, respectively, which have exhaust ports 66, 67, 68 and 69 respectively, connected to a common outlet line 70. The common outlet line 70 is connected to the air conduit 16 through a check valve 71. Each of the flow control valves 62–65 allows a different quantity of water to flow when opened. By opening the flow control valves 62–65 individually, or in combinations of two or more, seven different flow rates can be obtained. The flow control valves 62–65 are magnetically actuated by energizing respective coils 72, 73, 74 and 75. One end of each coil 72–75 is connected to ground, and the other ends of the coils 72–75 are connected to respective fixed contacts 76, 77, 79 and 81 of a manually actuated, rotary switch 36. Three other fixed contacts 78, 80 and 82 of the rotary switch 36 are connected as described below.

The rotary switch 36 has a pair of common, movable contacts 83 and 84 mounted on a common shaft 85. The movable contacts 83 and 84 can be rotated to make electrical connection with any of the fixed contacts 76–82. The relative positions of the two movable contacts 83, 84 remain fixed with respect to each other, so that they make connection with a different pair of adjacent fixed contacts 76–82. A coupling diode 86 connects the first and second valve-fixed contact 78 to the first valve-fixed contact 76, and another coupling diode 87 connects the first and second fixed contact 78 to the second valve-fixed contact 77. The second and third valve-fixed contact 80 is connected to the second valve-fixed contact 77 by a coupling diode 91 and to the third valve-fixed contact 79 by a coupling diode 88. The third and fourth valve-fixed contact 82 is connected to the third valve contact 79 by a coupling diode 89, and another coupling diode 90 connects the third and fourth valve-fixed contact 82 to the fourth valve contact 81. When current flows into either movable contact 83 or 84, it will conduct the current to the fixed switch contact 76–82 which it contacts, and from the stationary contact 76–82 the current will flow through the respective coils or coil 72–75 and to ground, thus exciting a coil 72–75, or combination of coils 72–75, and opening the corresponding flow control valve or valves 62–65.

The current necessary to operate the flow control valves 62–65 is provided by a positive DC current source (not shown) connected between a terminal 92 and ground. The terminal 92 is connected through a pair of series-connected normally closed water shutoff relay contacts 37 and 93 to one terminal 94 of a relay coil 95, the other end of which is connected to ground. The terminal 94 is also connected to a normally closed normal flow relay contact 96 and a normally open reduce flow relay contact 97. The normal flow and reduce flow contacts 96 and 97 are parts of a waterflow relay 99 and are actuated by the magnetic field generated by a coil 100 of the waterflow relay 99. The normal flow relay contact 96 is connected to the normal flow movable switch contact 83 of the rotary switch 36, and the reduce flow relay contact 97 is connected to the reduce flow movable switch contact 84 of the rotary switch 36. The water shutoff contact 93 is actuated by the magnetic field of a wet depth relay coil 98 when it is energized.

During normal drilling, current flows through the normally closed water shutoff contacts 37 and 93 and the normal flow contact 96, to the normal flow movable contact 83 of the rotary switch 36. In FIG. 2 the movable contacts 83 and 84 have been set by the operator to make contact with the third and fourth valves-fixed contact 82 and the fourth valve-fixed contact 81, respectively, and current is conducted through the normal flow contact 83 to the third and fourth valves-fixed contact 82. From the third and fourth valves-fixed contact 82, current flows through coupling diodes 89 and 90 to the respective coils 74 and 75 which open the third and fourth flow control valves 64 and 65, respectively.

The coil 100 of the water flow control relay 99 is connected between the power input terminal 92, on one side, and ground on the other. Two paths to ground are provided: one through a grounding relay contact 101 controlled by a grounding relay coil 95 and the other through a normally open holding contact 102, which is part of the waterflow control relay 99. The normally open holding contact 102 is connected to ground through an indicator light 103, and during normal operation the grounding relay coil 95 is energized and its contact 101 remains open. If the water injection were shutoff by the air pressure monitor 25, the water shutoff contact 37 would open interrupting current flow to the third and fourth valve coils 74 and 75, thus closing the flow control valves 64 and 65. Simultaneously, the grounding relay coil 95 would be deenergized, closing the contact 101 to energize the waterflow control relay coil 100. The holding contact 102 would close to provide a ground path for current through the reduce flow relay coil 100 and the indicator light 103, locking the waterflow relay 99 into an energized state. When air pressure drops and water shutoff switch 37 closes again, the relay coil 95 energizes and opens grounding contact 101. The waterflow control relay 99, however, remains locked in its energized state, holding the normal flow contact 96 open and the reduce flow contact 97 closed, so that current continues to flow through the reduce flow contact 97 to the reduce flow movable switch contact 84. Since the reduce flow movable switch contact 84 engages the fourth valve-fixed contact 81, the current flows through fourth valve-fixed contact 81 energizing only the coil 75 which opens fourth flow control valve 65 only. The current flowing through the holding contact 102 lights the indicator light 103 to notify the operator that waterflow has been reduced.

Figure 3:
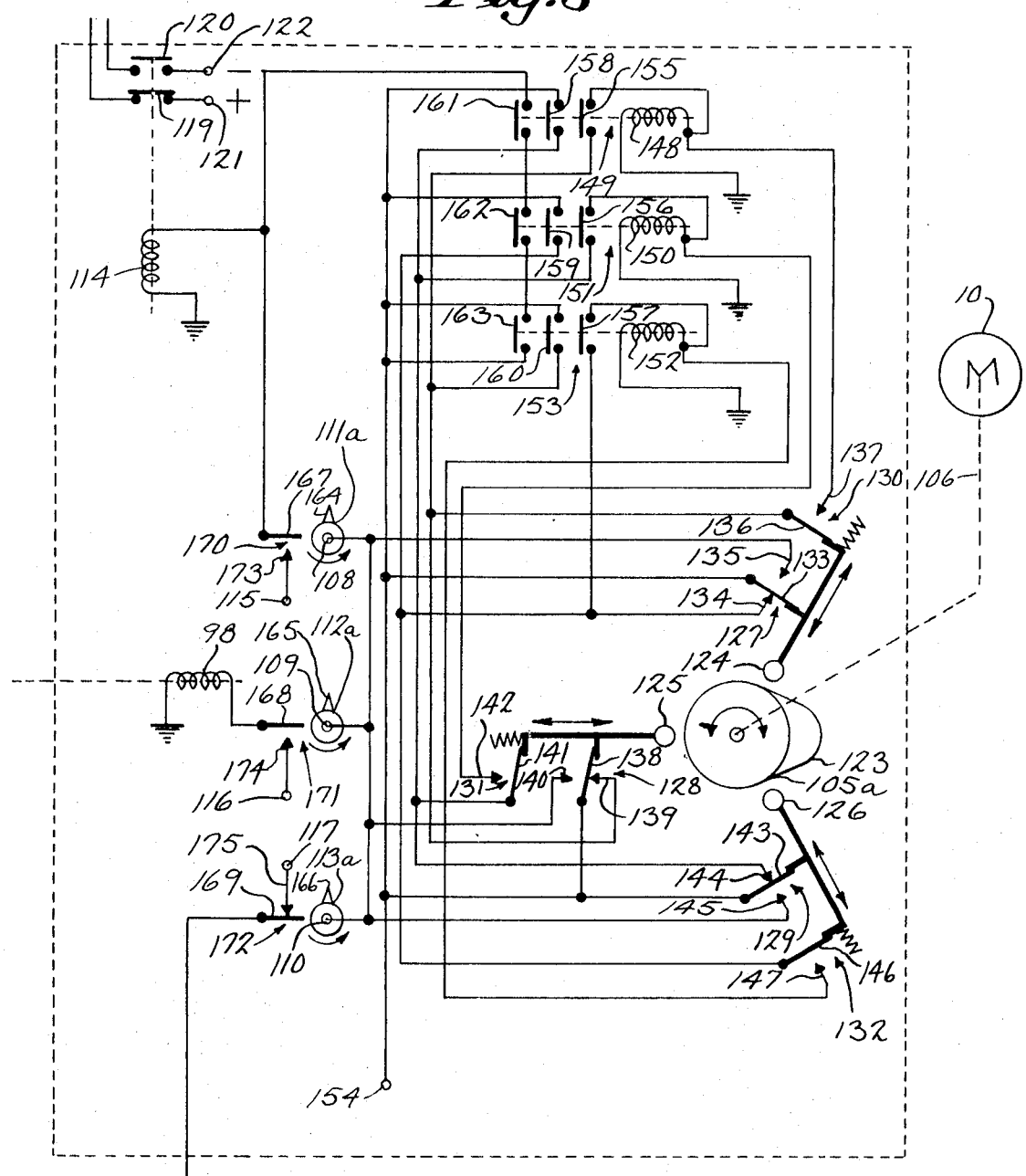
FIG. 3 is a schematic diagram of an alternative embodiment of a depth counter.

The depth counter system 104 is shown in block diagram form in FIG. 1 and in schematic form in FIGS. 2, with an alternative embodiment schematically diagrammed in FIG. 3. Referring to FIG. 2 the downfeed drive motor 10 is connected to drive a rotating cam 105 through a conventional drive linkage 106. The cam 105 is provided with three equally spaced lobes to close a normally open counting switch 107 three times in each rotation of the cam 105. When the counting switch 107 is closed, it connects the positive DC voltage to power input terminals 108, 109 and 110, respectively, of stepping motors (not shown) in each of three counters 111, 112, and 113. Counters, such as the counters 111, 112 and 113, are commercially available units which require no structural description for the present purposes.

One terminal 115 of the first counter 111 is connected to an external voltage source and to an internal, normally open switch (not shown) which is connected through total depth relay coil 114 to ground and which switch is actuated by the rotation of the stepping motor (not shown) in counter 111. One terminal of the second counter 112 is connected to an external voltage source and an internal normally open switch contact (not shown) which is connected to ground through wet depth relay coil 98, and the internal switch is actuated when the counter 112 is rotated by its stepping motor (not shown). One terminal of the third counter 113 is connected to an external voltage source and an internal normally closed switch (not shown) which is opened by the rotation of the counter 113 under the impetus of its stepping motor (not shown) to open the circuit from the external voltage source to the rotary speed control 13 and the downfeed speed control 12.

As the downfeed drive motor 10 rotates it rotates the cam 105, which closes the normally open counting switch 107 three times each revolution, to generate an electrical counting pulse to the three counters 111, 112, and 113 each time the switch 107 closes. The number of the pulses of current, or counts, thus generated and transmitted to the counters 111–113 is registered by each of the counters 111–113. When various preset numbers of counts are registered by the counter 111–113, the counters 111–113 are individually set to actuate the respective internal switches (not shown) in each. The third counter 113 is preset to open the The from the external voltage source on the terminal 117 to the rotary speed control 13 and the downfeed speed control 12 when the bit 9 reaches the desired collaring depth. Removal of voltage source 117 from the inputs of the linear speed control 12 and rotary speed control 13 causes the rotary and linear motions of the drill 8 to increase to the preset drilling speed. Hence, the third counter 113 may be considered the collaring counter 113.

When the total number of preset counts is registered by the second counter 112, its normally open, internal switch (not shown) is closed and the wet depth relay coil 98 is energized by the voltage source on the terminal 116. This actuates the water shutoff switch 93 turning the water off at a depth determined by the setting on counter 112. Thus the second counter 112 may be termed the wet depth counter 112.

When the desired total hold depth is reached, the first counter 111 actuates its normally open internal switch (not shown), causing the total depth relay coil 114 to be energized by the voltage source on the terminal 115. The magnetic field of the energized total depth relay coil 114 opens a normally closed contact 110 and closes a normally open contact 120. The normally closed contact 119 of the total depth relay is connected between a terminal 121 connected to a positive voltage source and the downfeed speed control 12, while the normally open contact 120 is connected between a terminal 122 connected to a negative voltage source and the downfeed speed control 12. Hence, actuation of the total depth relay reverses the polarity of the signal to the downfeed speed control 12, causing it to reverse the downfeed motor 10 to hoist the drill 8. Thus the first counter 111 is termed the total depth counter 111.

To operate a blasthole drill of this embodiment the operator who is familiar with the terrain and the local drilling conditions, makes the initial speed settings on the linear and rotary speed controls 12 and 13 to obtain maximum drilling efficiency. He sets the collaring counter 113 to the depth at which collaring is to terminate and normal drilling speed commenced. He sets the total depth counter 111 to the desired hole depth, and the wet depth counter 112 to a few feet less than total depth to turn off the water injection before total depth is reached. Automatic drilling is then commenced. As the vertical traverse unit 7 is driven downward by the linear drive motor 10, the cam 105 rotates and periodically closes counting switch 107. The three counters 111, 112 and 113 register these "counts" and as each counter 111, 112 and 113 registers its preset depth, as measured by the number of "counts" it receives, it signals that depth to the appropriate system or control with the described electrical signals, which respectively terminate collaring and initiate normal drilling, turn off the water injection, and, finally, hoist the drill 8 from the completed hole.

When drilling is thus completed and while the drill is hoisted from the hole, rotation and blast air continue until the vertical traverse unit 7 trips a microswitch (not shown) to the mast 6 which is located so that the drill bit 9 will still be a few feet below the earth's surface. The machine is completely shut down when the bit is totally extracted and the operator is notified by lights and horns that drilling has been completed.

FIG. 3 diagrams an alternative embodiment that adds another automatic function to the blasthole drill. The circuit diagrammed in FIG. 3 is a depth counter system 104a, which can be substituted for the depth counter system 104 in FIG. 2, and to the extent that the components in the alternative depth counter system 104a are the same as the components in the first depth counter system 104 shown in FIG. 2, the same reference numerals are used in both.

The downfeed drive motor 10 is connected by a drive linkage 106 to drive a cam member 105a, which in this embodiment has a single lobe 123. First, second and third cam followers 124, 125 and 126 are mounted at equally spaced locations about the cam 105 for axially reciprocating movement. Each of the cam followers 124, 125 and 126 is connected to actuate one single-pole-double-throw (hereafter abbreviated to "spdt") switch 127, 128 and 129, respectively, and one single-pole-single-throw (hereafter abbreviated to "spst") switch 130, 131 and 132, respectively. The spdt switch 127 at the first cam follower 124 has a common contact 133 normally closed to a deenergizing contact 134 and normally open to a counter contact 135. The spst switch 130 actuated by the first cam follower 124 has a movable contact 136 that is normally opened to a fixed contact 137. Similarly, the second cam follower 125 actuates the spdt switch 128, which has a common contact 138 that is normally closed to a deenergizing contact 139 and normally opened to a counter contact 140; and the second follower 125 actuates the spst switch 131 that has a movable contact 141 that is normally open to a fixed contact 142. Finally, the third cam follower 126 actuates the spdt switch 129 by moving its common contact 143 that is normally closed to a deenergizing contact 144 and normally open to a counter contact 145, and the third cam follower 126 also actuates the spst switch 132 driving its movable contact 146 which is normally open to its fixed contact 147.

The fixed contact 137 of the normally opened spst switch 130 actuated by the first follower 124 is connected to a coil 148 of a first automatic hoist relay 149, the other end of which is grounded. The fixed contact 142 of the spst switch 131 that is actuated by the second cam follower 125 is connected to one end of a coil 150 of a second automatic hoist relay 151, the other end of which is grounded. Finally, the fixed contact 147 of the normally open spst switch 132 that is actuated by the third cam follower 126 is connected to one end of a coil 152 of a third automatic hoist relay 153.

The common contacts 133, 138 and 143 of the spdt switches 127, 128 and 129, respectively, are connected together, and are connected in common to an input terminal 154 which is connected to an operating voltage source (not shown). Also, the counter contacts 135, 140 and 145 of the spdt switches 127, 128 and 129 are connected together and are connected in common to the operating input terminals 108, 109 and 110 of three counters 111a, 112a and 113a, respectively, which correspond operatively to the three counters 111, 112 and 113 of the FIG. 2 embodiment. Thus, each time one of the common contacts 133, 138 or 143 is actuated by its follower 124, 125 or 126, respectively, a counter pulse is sent to each of the counters 111a, 112a, and 113a; in other words, all three counters 111a–113a receive three counter pulses with each revolution of the cam 105a.

Each of the automatic hoist relays 149, 151 and 153 has a self-holding contact 155, 156 and 157, respectively, a reverse locking contact 158, 159 and 160, respectively, and a hoist contact 161, 162 and 163, respectively. All of the contacts 156–164 of the automatic hoist relays 149, 151 and 154 are normally open. The host contacts 161–163 are connected in series between the input terminal 154 and the total depth relay coil 114 so that when all three hoist contacts 161–163 are closed the total depth relay coil 114 will be energized. The self-holding contact 155 of the first automatic hoist relay 149 is connected between the coil 148 of that relay and the common contact 136 of the spst switch 130 actuated by the first cam follower 124 and the deenergizing fixed contact 139 of the spdt switch 128 actuated by the second cam follower 125, and it is also connected through the reverse locking contact 160 of the third automatic hoist relay 153 to the voltage input terminal 154. Similarly, the self-locking contact 156 of the second automatic hoist relay 151 is connected between the coil 150 of that relay and the movable contact 141 of the spst switch 131 actuated by the second cam follower 125 and the deenergizing contact 144 of the spdt relay 129 actuated by the third cam follower 126, and through the reverse locking contact 158 of the first automatic hoist relay 159 to the input voltage terminal 154. In a corresponding arrangement the self-holding contact 157 of the third automatic hoist relay 153 is connected between the coil 152 of that relay 153 and the movable contact 146 of the spst switch 132 actuated by the third cam follower 126 and the deenergizing contact 134 of the spdt switch 127 actuated by the first cam follower 124, and it is connected though the reverse locking contact 159 of the second automatic hoist relay 151 to the voltage input terminal 154.

The counters 111a, 112a, and 113a are shown in FIG. 3 to each have a single cam lobe 164, 165 and 166, respectively. So that when the counters 111a-113a are rotated by the respective stepping motors (not shown) energized by pulses from the counting contacts 135, 140 and 145 of the spdt switches 127, 128 and 129, they will actuate movable contacts 167, 168 and 169, respectively, of internal switches 170, 171 and 172. The internal switch 170 has its fixed contact 173 connected to a voltage source through the terminal 115, and the internal switch 171 has its fixed contact 174 connected to a voltage source through the terminal 116, and the internal switch 172 has its fixed contact 175 connected to a voltage source through the terminal 117. The internal switch 172 of the collaring counter 113a is normally closed whereas the other internal switches 170 and 171 of the total depth counter 111a and the wet depth counter 112a are normally open. In other respects, the connection of the components are the same as described above in connection with the other embodiment shown in FIG. 2.

So long as the drill 8 is being fed down into the hole, the cam 105a in FIG. 3 will be driven in a counterclockwise direction and the circuit functions to transmit counting pulses to the counters 111a, 112a and 113a. As the followers 124, 125 and 126 are sequentially actuated by the lobe 123 of the cam 105a, they actuate the spdt switches 127, 128 and 129 to send a pulse from the common contacts 133, 138 and 143 through the counter contacts 135, 140 and 145. The spst switches 130, 131 and 132 are also sequentially closed to energize the coils 148, 150 and 152 of the respective relays 149, 151 and 153. Thus the self-holding contacts 155, 156 and 157 are sequentially closed to hold the relays 149, 151 and 153 energized, but the circuit from the respective self-holding contacts 149, 151 and 153 to the input terminal 154 is sequentially opened by the actuation of the spdt switch 127, 128 or 129 by the next follower 124, 125 or 126 to be engaged by the cam lobe 123. Thus the relays 149, 151 and 153 are sequentially energized briefly and then deenergized so they do not affect the operation of the drill 8.

However, if the drill 8 is hoisted, the cm 105a is driven in a clockwise direction and a different operation results. As the cam 105a is shown, the third follower 132 will be actuated first, closing its spst switch 132 to energize the third relay 153, which is held by its holding contact 157. When the lobe 123 on the cam 105a actuates the second follower 125, its spst switch 131 energizes the second rely 151 which is then held by its holding contact 156. Meanwhile the third relay 153 continues to be held by its holding contact 157 which is connected to the input terminal 154 through the spdt switch 127 at the first follower 124. When the first follower 124 is actuated by the cam lobe 123, it energizes the first relay 149 through its spst switch 130. However, the actuation of the spdt switch 127 by the first follower 124 also opens the original circuit between the holding contact 157 of the third relay 152 and the input terminal 154, but the locking contact 159 of the second relay 151 has been closed across the spdt switch 127 on the first follower 124, so the holding contact 157 of the third relay 152 is still connected to the input terminal 154 and continues to hold the third relay 153. Thus, each relay 149, 151 and 153 will be held by the locking contact 159, 158 and 160 of the next succeeding relay as the drill 8 is hoisted.

When the drill 8 has been hoisted far enough to energize all three relays 148, 150 and 152, all three being held energized, the three series connected hoist contacts 163, 162 and 161 will be closed. This completes a circuit from the power input terminal 154 through the hoist contacts 163, 162 and 161 and through the total depth relay coil 114 to ground. As explained in connection with the description of FIG. 2, the energization of the total depth relay coil 114 will reverse the downfeed and cause the drill 8 to be hoisted.

Manifestly the hoist distance necessary to energize the total depth relay coil 114 can be varied by changing the number of relays 148, 150 and 152 and associated followers 124, 125 and 126. Also, two or more of the relays' holding contacts 161, 162 and 163 could be connected in parallel with one another between the input terminal 154 and the total depth relay coil 114 to shorten the hoist distance necessary to retract the drill 8 from the hole. Thus the drill 8 may be retracted to a predetermined distance responsive to an excessive air pressure signal and if lower air pressure is restored the drill 8 may resume its downfeed without interruption. However, if the air pressure remains excessive causing the hoist of the drill 8 to exceed the preset distance, the automatic hoist will take over, retract the drill 8 from the hole, stop the machine and alert the operator.

The foregoing sets forth a written description of the invention, and of the manner and process of making and using it, in sufficiently full, clear, concise and exact terms as to enable any person skilled in the art to which it pertains or with which it is most nearly connected, to make and use the same, and, in addition, the foregoing description sets forth the best mode presently contemplated by the inventors for carrying out their invention. By contrast with that written description of the preferred mode carrying out the invention, the specification concludes with the following claims which particularly point out and distinctly claim the subject matter which the applicants' regard as their invention.

We claim:

1. A rotary earth-boring drill having a drill mounted for rotary and axial feed motion, a controlled rotary drive motor connected to rotate said drill, and a controlled downfeed drive motor connected to axially downfeed and hoist said drill, in combination therewith, a depth counter system having a pulse-generating member connected to be driven by said downfeed drive motor to generate a pulse signal for each increment of downfeed movement, and an adjustable counter connected to receive said pulses and to register said pulses and to energize a relay when a preset number of pulses have been generated;

and a downfeed drive control connected to cause said downfeed drive motor to hoist said drill when said relay is energized.

2. A rotary earth-boring drill as set forth in claim 1, wherein said depth counter system has a second adjustable counter connected to receive and register said pulses and to actuate a switch when a preset number of pulses have been generated;

and a rotary speed control connected to control the speed of said rotary drive motor and responsive to said switch to accelerate said motor to a preset speed when said switch is actuated.

3. An automatic control system for a rotary drill comprising the combination of a rotary drill mounted for rotary and axial downfeed movements;

a rotary drive motor connected to said rotary drill to rotate said rotary drill and responsive to a rotary speed control means to operate at preset speeds responsive to a collaring depth command signal;

a downfeed drive motor connected to said rotary drill to impart axial downfeed and hoist movements to said rotary drill and responsive to a downfeed speed control means to operate at preset speeds responsive to a pressure command signal and to a total depth command signal;

and a depth counter connected to said downfeed drive motor to sense distance of downfeed movement of said rotary drill and to generate said collaring depth command signal to said rotary speed control at a preset depth and to generate said total depth command signal to said downfeed speed control at another preset depth.

4. An automatic control system for a rotary blasthole drill as set forth in claim 3, wherein said rotary drill is hollow and an air compressor is connected to the top end of said vertical hollow rotary drill and forces air through and out the bottom end of said hollow rotary drill;

and an air pressure sensor is connected to measure the air pressure in said hollow rotary drill and generate an electrical air pressure signal proportional to said air pressure;

an air pressure monitor connected to receive said air pressure signal and generate a command signal to said downfeed speed control slowing down or reversing the direction of downfeed of said rotary blasthole drill responsive to said air pressure signal.

5. An automatic control for a rotary blasthole drill comprising the combination of a hollow rotary drill mounted for rotary movement and axial movement;

a rotary drive motor connected to said rotary drill to rotate said rotary drill;

a rotary speed control means connected to operate said rotary drive motor at a preset speed and to alter said preset speed responsive to a collaring command signal;

a downfeed drive motor connected to said rotary drill to impart downfeed and hoist movements to said rotary drill;

a downfeed speed control connected to operate said downfeed drive motor at a preset speed and to alter said preset speed responsive to said collaring command signal and to a pressure command signal and to a total depth command signal;

an air compressor connected to the top end of said hollow rotary drill to force air through and out the bottom end of said hollow rotary drill;

a water injection system connected to force water into said air being forced through said hollow rotary drill and to shut off said water responsive to a water command signal;

an air pressure sensor connected to measure the air pressure in said hollow rotary drill and to generate an electrical air pressure signal proportional to said air pressure;

an air pressure monitor connected to receive said air pressure signal and to generate a pressure command signal to said downfeed speed control slowing down or reversing the direction of axial movement of said rotary drill when said air pressure exceeds a preset amount and to generate a water command signal to said water injection system shutting off said water when said air pressure signal exceeds another preset amount;

a collaring depth counter connected to said downfeed drive motor to sense the amount of downfeed movement of said rotary drill and to generate a collaring command signal to said downfeed speed control and said rotary speed control reducing said preset linear and rotary speeds of said rotary blasthole drill until said rotary drill travels a preset linear distance into the earth;

a total depth counter connected to said downfeed drive motor to sense the amount of linear movement of said rotary drill and to generate a total depth command signal to said downfeed speed control to hoist said rotary drill when said rotary drill travels a preset linear distance into the earth;

and a wet depth counter connected to said downfeed drive motor to sense the amount of linear movement of said rotary blasthole drill and to generate a water command signal to said water injection system turning off the water when said rotary blasthole drill travels a preset linear distance into the earth.

6. An automatic control system for a blasthole drill as set forth in claim 5, wherein said water injection system comprises the combination of a water pump connected to a source of water and connected to pump said water through an exhaust line when the pump is rotated;

a motor connected to rotate said water pump;

a plurality of flow control valves connected in a parallel configuration to said exhaust line;

a common outlet line connecting the exhaust ports of said flow control valves with said air flowing into said hollow rotary blasthole drill;

a selector switch connected to open a preset flow control valve or combination of flow control valves until said water command signal is received and when said water command signal is received and removed a different flow control valve or combination of flow control valves is opened allowing less water to flow than said preset flow control valve or combination of flow control valves.

7. An automatic control for a rotary blasthole drill as set forth in claim 5, wherein means driven by said downfeed drive motor sequentially energizes a plurality of relays during downfeed and hoist;

said relays are connected to sequentially deenergize during downfeed and to hold during hoist;

and said relays have contacts connected to command said downfeed speed control to retract said drill when more than one of said relays is simultaneously held energized.